Patented Apr. 21, 1936

2,037,792

UNITED STATES PATENT OFFICE 2,037,792

TREATMENT OF HYDROCARBON OILS

Vladimir Ipatieff, Chicago, Ill., assignor to Universal Oil Products Company, Chicago, Ill., a corporation of Delaware No Drawing. Application December 4, 1933, Serial No. 700,879

11 Claims. (Cl. 196—24)

This invention relates more particularly to the treatment of the lower boiling gasoline hydrocarbons produced from cracking heavy petroleum oils, though natural or uncracked gasolines produced in the primary distillation of crude petroleum or other low boiling hydrocarbon oil mixtures may also be treated.

In a more specific sense the invention has reference to a process for treating such motor fuel mixtures to reduce their sulphur content and produce other desirable refining effects.

Low boiling cracked distillates, particularly those produced by cracking high sulfur charging oils under intensive conditions, contain two classes of undesirable constituents in minor proportions. The first class comprises hydrocarbons of the character of di- and tri-olefins, which have pronounced gum-forming tendencies and also cause the development of color during storage. The second class comprises, in addition to minor amounts of hydrogen sulfide, such hydrocarbon sulfur derivatives as mercaptans, thio-ethers, thiophenes, thiophanes, et cetera, members of this class being generally objectionable on account of their bad odor and also generally an account of their corrosive tendencies either before or after combustion in the cylinders of internal combustion engines.

The relative proportions of these two undesirable classes vary considerably but in general it may be stated that both classes are always present in cracked gasolines. While a number of processes aimed at the controllable reduction by polymerization of the gum-forming materials have been successful, I am not aware of any present commercial process which is effective in selectively reducing the sulfur content of cracked distillates without undesirably affecting the unsaturated olefinic constituents. Sufficiently strong sulfuric acid treatments for reducing sulfur content cause large polymerization losses among the mono-olefins as well as among the di- and tri-olefins so that too much antiknock material is lost. The present invention makes possible the selective and controllable reduction in sulfur content of cracked distillates by a simple process which will be described in detail in the following specification.

In one specific embodiment the invention comprises treatment of hydrocarbon oils, particularly cracked hydrocarbon oils in heated vaporous condition, with hydrogen or hydrogen-containing gases such as cracked gases, water gas, et cetera, in the presence of selected catalysts comprising nickelous oxide, molybdenum trioxide and sodium aluminate to produce good treating effects.

In another specific embodiment, the invention may comprise similar treatments with the hydrocarbon oils in liquid phase or partly in liquid and partly in vapor phase.

I have found that reactions of limited hydrogenation leading to desulfurization of cracked distillates and similar low boiling straight run distillates may be accomplished with particularly good efficiency when employing as catalysts mixtures of nickelous oxide, molybdenum trioxide and sodium aluminate. The preferred amounts, expressed in percentage by weight of the total mixture, are approximately as follows:

| | Percent |
|---|---|
| Nickelous oxide, NiO | 50 |
| Molybdic oxide, $MoO_3$ | 40 |
| Sodium aluminate, $Na_2Al_2O_4$ | 10 |

Mixtures of this character may be prepared in a relatively simple manner by adding the two metallic oxides to relatively concentrated aqueous solutions of sodium aluminate and evaporating the water to leave a solid residue of the desired composition, which is then broken up and sized to produce particles of such a diameter that they exert a sufficient amount of catalytic surface action without offering too great resistance to the flow of vapors through them.

The sodium aluminate in the catalyst mixture apparently functions in a dual manner to cement the metal oxides and allow the production of catalyst particles which are resistant to the disintegrating action of hot hydrocarbons and in addition to promote the activity of the catalyst mass. It has been determined by a large number of tests that 10% of sodium aluminate represents the optimum quantity for binding together the metal oxides and assuring a catalyst which will not disintegrate in service over long periods of time.

The ratio of approximately 5 parts of nickelous oxide to 4 parts of molybdic oxide is apparently also an optimum, although this ratio admits of some variation without adversely affecting the efficiency of the mixed catalyst. The use of chemically pure oxides is not necessary and good results have been obtained using commercial products as will be shown in a later example. Thus, molybdic oxide purchased as a commercial or technical grade not infrequently contains considerable quantities of ammonium salts, due to its preparation by precipitation from solutions of ammonium molybdate. The example will also show that the presence of considerable quantities of these salts has no deleterious effect. Some of such impurities are undoubtedly lost under the conditions of temperature and pressure employed in desulfurizing runs, and their loss may result in a slight increase in porosity of the total catalyst mass.

As one alternative to the simple mixing of the relatively dry metal oxides and adding them to the sodium aluminate solution they may be precipitated from solutions of their salts by means of suitable reagents such, for example, as the carbonates and hydroxides of the alkali metals. The precipitates are suitably washed to remove adhering reagents and then heated at a suitable temperature for producing the oxides. The mixture of oxides is then added to the solution of an alkali metal aluminate, the solvent evaporated and the mixture of oxides and aluminate dried at temperatures of approximately 200–220° C., preferably not above the last named temperature.

In utilizing catalysts of the present type in the treatment of hydrocarbon oils in vapor phase, they may be employed alone or in admixture with or deposited upon relatively inert silicious spacing materials or carriers, such as adsorbent earths, crushed firebrick, silica fragments, et cetera, the masses being placed in vertical cylindrical treating towers or deposited therein upon regularly spaced trays or pans over which a mixture of hydrocarbon oil vapors and hydrogen-containing gases is passed. The amount of hydrogen introduced from outside sources will depend upon the amount of free hydrogen already present in the vapors, and upon the chemical character of the hydrocarbons and particularly upon the form of combination of the sulfur. As a general rule the sulfur derivatives in which the sulfur atom is a member of a heterocyclic ring are the most difficultly decomposable, and larger amounts of hydrogen along with the more efficient catalysts will be necessary when the oils contain high percentages of such compounds, which include thiophene and its analogs and their derivatives.

When operations are conducted in liquid or liquid-vapor phase suitably modified apparatus may be employed for effecting the proper contact between the catalyst masses, the oils and the hydrogen-containing gases.

It is a feature of the present invention that when employing catalysts of the type disclosed that relatively low temperatures and pressures are sufficient to effect a large amount of sulfur reduction. For example, temperatures of from 250 to 400° C. are sufficient and pressures of atmospheric or moderately superatmospheric, such as, for example, up to 100 pounds per square inch. However, when dealing with refractory stocks, it may be of greatest advantage to employ superatmospheric pressures of a high order such as, for example, 1,000 to 2,000 pounds per square inch and such pressures may be employed without departing from the scope of the invention.

After a certain definite period in the case of any particular catalyst composite of the present type, a certain fatigue becomes manifest due to the formation of metal sulfides which as a general rule have less catalytic activity than the original catalyst. At such times the original activity may be restored by oxidation with air at temperatures from 300 to 450° C. Any metal sulfites or sulfates which are formed are washed from the mass by water, (which may or may not remove a certain amount of the aluminate), and the extracted material suitably treated to reproduce oxides which are then available for use in the making of fresh catalytic contact materials. In many instances a number of simple air regenerations may be practiced before it is necessary to wash soluble salts from the mass or use any other purifying or recovery steps.

Numerous examples might be given of the refining effects obtained by using the particular catalyst mixtures comprised within the scope of the invention in the refining of cracked and straight run distillates, but the following is sufficiently indicative to show the improved results which were obtained in one case.

A California cracked distillate, the 400 end point gasoline fraction of which contained 0.63% sulfur and showed 690 mg. of gum by the copper dish test was vaporized, mixed with a small amount of hydrogen and passed at a temperature of 375° C. and a gauge pressure of 20 pounds per square inch over a catalyst having the following composition:

*Composition of catalysts*

| | Percent |
|---|---|
| Molybdic oxide, $MoO_3$ | 33.1 |
| Nickelous oxide, NiO | 51.7 |
| Sodium aluminate, $Na_2Al_2O_4$ | 9.2 |
| Inerts (mostly ammonium salts) | 6 |

The vapors following the catalyst chamber were fractionated to produce a 400 end point treated gasoline and the following table of properties shows a comparison between the raw cracked gasoline producible by a simple distillation and that produced from the catalytic desulfurizing plant.

| | Raw | Treated |
|---|---|---|
| Gum by copper dish | 693 | 90 |
| Gum content with inhibitor | | 30 |
| Octane number | 72 | 72 |
| Total sulfur, percent | 0.63 | 0.25 |

The stock in question was particularly difficult to desulfurize, even when using considerable quantities of sulfuric acid. When the hydrogenating treatment was preceded by the use of two pounds per barrel of 66° Bé. sulfuric acid, thus relieving the catalytic process of some of the desulfurizing burden, the sulfur could be reduced as low as 0.15% under approximately the same conditions as those described above.

The foregoing specification and examples have disclosed and illustrated the invention, but since it is of generally wide application and the number of examples of results obtainable by its use might be multiplied greatly neither is to be used to impose undue limitations upon its generally broad scope.

I claim as my invention:

1. A process for the treatment of hydrocarbon oil to refine the same and to reduce the sulphur content thereof, which comprises subjecting said hydrocarbon oil to the action of hydrogen in the presence of a catalyst comprising a mixture of nickelous oxide, molybdenum oxide and sodium aluminate at a temperature adequate to react the hydrogen with sulphur compounds contained in the oil.

2. A process for the treatment of hydrocarbon oil to refine the same and to reduce the sulphur content thereof, which comprises subjecting said hydrocarbon oil under superatmospheric pressure to the action of hydrogen in the presence of a catalyst comprising a mixture of nickelous oxide, molybdenum oxide and sodium aluminate at a temperature adequate to react the hydrogen with sulphur compounds contained in the oil.

3. A process for the treatment of cracked hydrocarbon oil to refine the same and to reduce the sulphur content thereof, which comprises subjecting said cracked hydrocarbon oil to the action of hydrogen in the presence of a catalyst comprising a mixture of nickelous oxide, molybdenum oxide and sodium aluminate at a temperature adequate to react the hydrogen with sulphur compounds contained in the oil.

4. A process for the treatment of cracked hydrocarbon oil to refine the same and to reduce the sulphur content thereof, which comprises subjecting said cracked hydrocarbon oil to the action of hydrogen in the presence of a catalyst comprising a mixture of nickelous oxide, molybdenum oxide and sodium aluminate in a proportion of substantially 50% nickelous oxide, 40% molybdenum oxide and 10% sodium aluminate at a temperature adequate to react the hydrogen with sulphur compounds contained in the oil.

5. A process for the treatment of cracked hydrocarbon oil to refine the same and to reduce the sulphur content thereof, which comprises subjecting said cracked hydrocarbon oil while in heated vaporous condition to the action of hydrogen in the presence of a catalyst comprising a mixture of nickelous oxide, molybdenum oxide and sodium aluminate at a temperature adequate to react the hydrogen with sulphur compounds contained in the oil.

6. A process for the treatment of hydrocarbon oil to refine the same and to reduce the sulphur content thereof, which comprises subjecting said hydrocarbon oil while at elevated temperature of from 250 to 400° C. to the action of hydrogen in the presence of a catalyst comprising a mixture of nickelous oxide, molybdenum oxide and sodium aluminate.

7. A process for the treatment of hydrocarbon oil to refine the same and to reduce the sulphur content thereof, which comprises subjecting said hydrocarbon oil while at elevated temperature of from 250 to 400° C. and superatmospheric pressure to the action of hydrogen in the presence of a catalyst comprising a mixture of nickelous oxide, molybdenum oxide and sodium aluminate.

8. A process for the treatment of hydrocarbon oil to refine the same and to reduce the sulphur content thereof, which comprises subjecting said hydrocarbon oil while at elevated temperature of from 250 to 400° C. and under superatmospheric pressure up to 100 pounds per square inch, to the action of hydrogen in the presence of a catalyst comprising a mixture of nickelous oxide, molybdenum oxide and sodium aluminate.

9. A process for the treatment of hydrocarbon oil to refine the same and to reduce the sulphur content thereof, which comprises subjecting said hydrocarbon oil while at elevated temperature of from 250 to 400° C. and under superatmospheric pressure up to 1,000 pounds per square inch to the action of hydrogen in the presence of a catalyst comprising a mixture of nickelous oxide, molybdenum oxide and sodium aluminate.

10. A catalyst comprising a mixture of nickelous oxide, molybdenum oxide and sodium aluminate.

11. A catalyst comprising a mixture of approximately 50% nickelous oxide, approximately 40% molybdenum oxide and approximately 10% sodium aluminate.

VLADIMIR IPATIEFF.